United States Patent
Davies et al.

(10) Patent No.: US 9,517,832 B2
(45) Date of Patent: Dec. 13, 2016

(54) AIRCRAFT WING WITH WING TIP DEVICE

(75) Inventors: Huw Davies, Bristol (GB); Nigel McKenna, Bristol (GB)

(73) Assignee: Airbus Operations Limited, Bristol (GB)

( * ) Notice: Subject to any disclaimer, the term of this patent is extended or adjusted under 35 U.S.C. 154(b) by 39 days.

(21) Appl. No.: 14/128,234

(22) PCT Filed: Apr. 23, 2012

(86) PCT No.: PCT/GB2012/050893
§ 371 (c)(1),
(2), (4) Date: Dec. 20, 2013

(87) PCT Pub. No.: WO2012/175928
PCT Pub. Date: Dec. 27, 2012

(65) Prior Publication Data
US 2014/0117158 A1    May 1, 2014

(30) Foreign Application Priority Data

Jun. 21, 2011  (GB) .................................. 1110493.2

(51) Int. Cl.
*B64C 3/00*    (2006.01)
*B64C 23/06*   (2006.01)

(52) U.S. Cl.
CPC ............... *B64C 3/00* (2013.01); *B64C 23/065* (2013.01); *Y02T 50/164* (2013.01); *Y10T 29/49826* (2015.01)

(58) Field of Classification Search
CPC ............. B64C 23/065; B64C 7/00; B64C 9/02
See application file for complete search history.

(56) References Cited

U.S. PATENT DOCUMENTS

| | | | |
|---|---|---|---|
| 5,065,960 A * | 11/1991 | Castellucci | 244/131 |
| 5,407,153 A | 4/1995 | Kirk et al. | |
| 8,814,100 B2 * | 8/2014 | Geders | 244/215 |
| 8,931,733 B2 * | 1/2015 | Dyckrup | 244/45 R |
| 2006/0076460 A1 | 4/2006 | Snow et al. | |
| 2007/0018049 A1 | 1/2007 | Stuhr | |
| 2007/0023573 A1 * | 2/2007 | Neale et al. | 244/124 |
| 2009/0283639 A1 | 11/2009 | Ackermann et al. | |

(Continued)

FOREIGN PATENT DOCUMENTS

FR    2 521 520    8/1983

OTHER PUBLICATIONS

International Search Report for PCT/GB2012/050893, mailed Oct. 30, 2012.

(Continued)

*Primary Examiner* — Tien Dinh
*Assistant Examiner* — Richard R Green
(74) *Attorney, Agent, or Firm* — Nixon & Vanderhye P.C.

(57) ABSTRACT

An aircraft wing assembly including: a wing having a wing box structure with an upper wing cover and a lower wing cover, and a wing tip device attached to the outboard end of the wing, the wing tip device including an upper cover and a lower cover, wherein a gap between opposing edges of the wing tip device lower cover and the lower wing cover is at least 5 mm, a seal assembly aerodynamically seals the gap, wherein the seal assembly includes a bridging component on an interior side of the gap, and a seal which fills the gap and is supported by the bridging component.

22 Claims, 5 Drawing Sheets

Detail A

(56) References Cited

U.S. PATENT DOCUMENTS

2010/0019094 A1\* 1/2010 Theurich et al. .......... 244/199.4
2013/0037655 A1\* 2/2013 Bradley et al. ............... 244/124

OTHER PUBLICATIONS

Written Opinion of the International Searching Authority for PCT/GB2012/050893, mailed Oct. 30, 2011.
UK Search Report for GB Application 1110493.2, dated Sep. 16, 2011.I.

\* cited by examiner

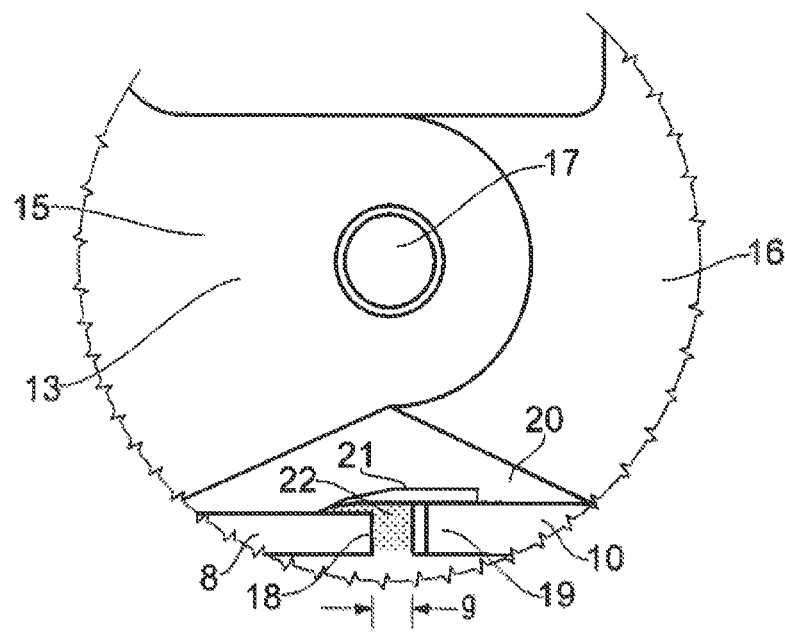
FIG. 5
Detail A
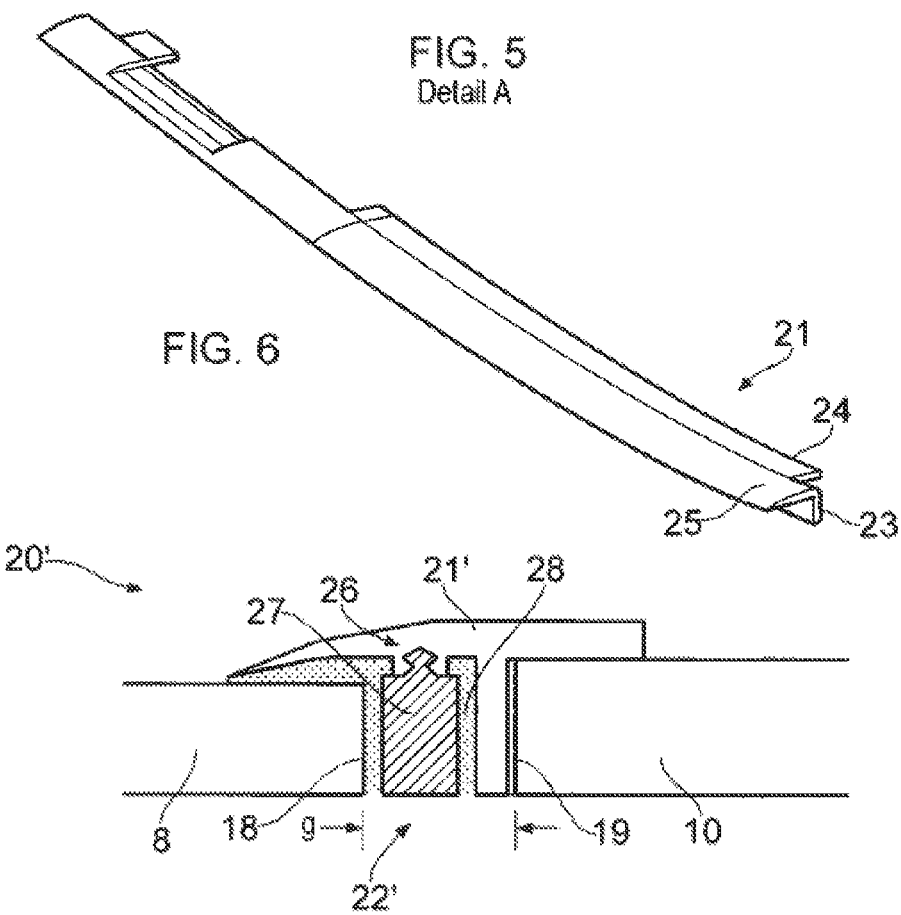
FIG. 6
FIG. 7

(Section A-A)

(Sections B-B & C-C)

(Section A-A)

AIRCRAFT WING WITH WING TIP DEVICE

This application is the U.S. national phase of International Application No. PCT/GB2012/050893, filed 23 Apr. 2012, which designated the U.S. and claims priority to GB Application No. 1110493.2, filed 21 Jun. 2011, the entire contents of each of which are hereby incorporated by reference.

FIELD OF THE INVENTION

The present invention relates to an aircraft wing assembly including a wing tip device attached to the outboard end of a wing, an aircraft having the wing assembly, and a method of attaching a wing tip device to the outboard end of a wing.

BACKGROUND OF THE INVENTION

An aircraft wing typically comprises a wing box structure including front and rear spars, a plurality of ribs extending between the spars, and an upper wing cover and a lower wing cover each extending between the spars. Various of the wing box components may be integrally formed.

A wing tip device is a device that may be attached to the outboard end of a wing to reduce induced drag on the wing. In the case of e.g. an aircraft wing this can lead to improved fuel efficiency and reduced carbon emissions. Several different types of wing tip device are known, including the winglet, the wing tip fence, and the raked wing tip for example.

The attachment between the outboard end of an aircraft wing and the inboard end of a wing tip device has traditionally been made using a tension type joint. As wing tip device technology improves, the aerodynamic loads that can beneficially be generated by the wing tip device, and which need to be transferred into the wing, has also increased. However, the area at the outboard end of the wing available for attaching the wing tip device remains relatively small, which poses difficulties in terms of successfully distributing these higher loads using traditional joint technology. In addition, the weight of the wing tip device may be increased due to the higher loads involved, which poses difficulties in terms of handling the wing tip device during assembly of the wing and during maintenance should the wing tip device need to be removed.

During installation/removal of the wing tip device there is a risk that the wing tip device and the wing may clash unless sufficient clearance is provided between adjacent surfaces. However, it is important that with the wing tip device installed the aerodynamic surface remains clean such that there is minimal adverse aerodynamic impact from the joint.

SUMMARY OF THE INVENTION

A first aspect of the invention provides an aircraft wing assembly comprising: a wing having a wing box structure including an upper wing cover and a lower wing cover; a wing tip device attached to an outboard end of the wing, the wing tip device including an upper cover and a lower cover, wherein a gap between opposing edges of the wing tip device lower cover and the lower wing cover is at least 5 mm; and a seal assembly for aerodynamically sealing the gap, wherein the seal assembly includes a bridging portion extending across an interior side of the gap to bridge the gap, and a seal portion which projects from the bridging portion to fill the gap.

Such a seal assembly is suitable for sealing the large (at least 5 mm) gaps necessarily formed at the joint between the lower covers of the wing and wing tip device, as discussed above. Typical gaps between fixed panels on the aerodynamic surface of an aircraft are much smaller than 5 mm, and are formed over underlying sub-structure upon which a bead of curable sealant can be formed after assembly. At the wing-wing tip lower cover joint, however, such an arrangement is not suitable because the bead of sealant would be unsupported by sub-structure and would have insufficient structural integrity to be retained within such a large gap.

The present invention solves these problems by providing a bridging portion to bridge the gap, and a seal portion projecting from that bridging portion to fill the gap. Such an arrangement can be fully or finally installed after assembly of the wing tip device to the wing, without risk of damage to the lower cover of either assembly.

The bridging portion preferably engages an interior surface of the lower wing cover and/or the wing tip device lower cover to retain the seal portion within the gap.

In preferred embodiments the seal assembly includes a retaining portion fixed to the seal portion and extending across an exterior side of the gap to retain the seal portion within the gap.

Thus, the seal assembly may be self-retaining; that is, the bridging portion and the retaining portion together may retain the seal portion within the gap without the requirement for any additional fixings or manufacturing process steps. Also, the retaining portion may serve to increase the overall stiffness of the seal assembly to further aid the retention of the seal portion within the gap. The retaining portion may engage an exterior surface of the lower wing cover and/or the wing tip lower cover to retain the seal portion within the gap.

At least a part of the retaining portion may be formed from a stiffer material than the seal portion. Thus, the stiffness of the seal assembly may be even further increased.

The at least a part of the retaining portion is preferably formed from a fibre-reinforced composite material. Thus, an exterior surface of the retaining portion may be painted, e.g. to match painted exterior surfaces of the lower wing cover and wing tip device lower cover. The composite material may be the same as that used to manufacture the lower wing cover or wing tip device lower cover.

At least a part of the bridging portion may be formed from a stiffer material than the seal portion, most preferably a fibre-reinforced composite material. In this way, the stiffness of the seal assembly may be increased, and thereby the ability of the bridging portion to retain the seal portion within the gap may also be increased.

The bridging portion preferably comprises an inboard flange which abuts an interior surface of the lower wing cover, and an outboard flange which abuts an interior surface of the wing tip lower cover. Similarly, the retaining portion preferably comprises an inboard flange which abuts an exterior surface of the lower wing cover, and an outboard flange which abuts an exterior surface of the wing tip device lower cover. Thus, the seal assembly may have a generally T-shaped cross-section along a majority of its length.

The seal portion may be formed from a substantially flexible resilient material, preferably rubber, or more preferably rubber reinforced with fabric. Thus, the seal assembly retains a degree of flexibility and resilience to flexing which is necessary for installation by sliding along the gap.

In some embodiments the seal portion includes a seal strip having a profile which cooperates with a mating profile of the bridging member to couple the seal strip to the bridging portion. In addition and/or alternatively, the seal portion may include curable sealant material.

The wing lower cover and wingtip device lower cover may have different thicknesses. Thus, the seal portion may have a cross-sectional profile such that a first side face adjacent an end face of the lower wing cover may have a different thickness (or depth) to a second side face adjacent an end face of the wing tip device lower cover. The bridging portion may be shaped and/or sized to accommodate such a thickness difference. For example, one or other or the inboard and outboard flanges of the bridging portion may have a ramped surface arranged at an acute angle to an end face of the lower wing cover or wingtip device lower cover, respectively, the ramped surface abutting a corresponding ramped surface of the lower wing cover or wingtip device lower cover, respectively. Alternatively, the cover-interfacing surfaces of the inboard and outboard flanges of the bridging portion may be offset from one another in the through-thickness (transverse) direction.

A second aspect of the invention, related to the first aspect, provides a method of attaching a wing tip device to the outboard end of an aircraft wing, the wing having a wing box structure including an upper wing cover and a lower wing cover, and the wing tip device having an upper cover and a lower cover, the method comprising: bringing the wing tip device and the wing tip device together; joining the wing tip device to the outboard end of the wing, wherein a gap between opposing edges of the wing tip device lower cover and the lower wing cover is at least 5 mm at completion of the joint; and installing a seal assembly to aerodynamically seal the gap, wherein the seal assembly includes a bridging portion arranged to extend across an interior side of the gap to bridge the gap, and a seal portion projecting from the bridging portion to fill the gap.

The step of joining the wing tip device to the outboard end of the wing may include forming a pinned lug joint.

The step of installing the seal assembly preferably includes sliding the seal assembly along the gap with the bridging component at the interior side of the gap and the seal portion within the gap. Thus, the seal assembly can be easily installed into its final position in one process step.

The seal assembly preferably includes a reinforcing component fixed to the seal portion and arranged to extend across an exterior side of the gap to retain the seal portion within the gap, and the step of installing the seal assembly preferably includes sliding the seal assembly along the gap with the bridging component at the interior side of the gap, the seal portion within the gap and the reinforcing component at the exterior side of the gap. Thus, the seal assembly can be easily installed into its final position in one process step, and can be self-retaining once installed.

A third aspect of the invention provides an aircraft wing assembly comprising: a wing having a wing box structure including an upper wing cover and a lower wing cover; a wing tip device attached to an outboard end of the wing, the wing tip device including an upper cover and a lower cover, wherein a gap between opposing edges of the wing tip device lower cover and the lower wing cover is at least 5 mm; and a seal assembly for aerodynamically sealing the gap, wherein the seal assembly includes a seal portion which fills the gap, and a retaining portion fixed to the seal portion and extending across an exterior side of the gap to retain the seal portion within the gap. The retaining portion may engage an exterior surface of the lower wing cover and/or wing tip device lower cover to retain the seal portion within the gap.

A related aspect of the invention provides a method of attaching a wing tip device to an outboard end of an aircraft wing, the wing having a wing box structure including an upper wing cover and a lower wing cover, and the wing tip device having an upper cover and a lower cover, the method comprising: bringing the wing tip device and the wing together; joining the wing tip device to the outboard end of the wing, wherein a gap between opposing edges of the wing tip device lower cover and the lower wing cover is at least 5 mm at completion of the joint; and installing a seal assembly to aerodynamically seal the gap, wherein the seal assembly includes a seal portion which fills the gap, and a retaining portion fixed to the seal portion and extending across an exterior side of the gap to retain the seal portion within the gap.

The step of installing the seal assembly preferably includes sliding the seal assembly along the gap with the seal portion within the gap and the reinforcing portion at the exterior side of the gap.

A fourth aspect of the invention provides an aircraft wing assembly comprising a wing having a wing box structure including an upper wing cover and a lower wing cover, and a wing tip device attached to the outboard end of the wing, the wing tip device including an upper cover and a lower cover, wherein a gap between opposing edges of the wing tip device lower cover and the lower wing cover is at least 5 mm, and further comprising a seal assembly for aerodynamically sealing the gap, wherein the seal assembly includes a bridging component on an interior side of the gap, and a seal which fills the gap and is supported by the bridging component.

A related aspect of the invention provides a method of attaching a wing tip device to the outboard end of an aircraft wing, the wing having a wing box structure including an upper wing cover and a lower wing cover, and the wing tip device having an upper cover and a lower cover, the method comprising: bringing the wing tip device and the wing together; joining the wing tip device to the outboard end of the wing, wherein a gap between opposing edges of the wing tip device lower cover and the lower wing cover is at least 5 mm at completion of the joint; and installing a seal assembly for aerodynamically sealing the gap, wherein the seal assembly includes a bridging component on an interior side of the gap, and a seal which fills the gap and is supported by the bridging component.

The fourth and related aspects are advantageous in that the bridging component supports the seal, which would otherwise have insufficient integrity to fill the larger than normal gap that is required to provide sufficient clearance for installation of the wing tip device.

The wing tip device lower cover, the lower wing cover and the seal preferably provide a substantially flush aerodynamic surface.

The bridging component is preferably attached to the wing tip device prior to installation of the wing tip device. Alternatively, the bridging component may be attached to the outboard end of the wing.

The bridging component may be substantially rigid. Some flexibility may be beneficial to accommodate tolerance but the bridging component is preferably relatively stiff.

The bridging component may include rubber material.

The bridging component may have a generally T-shaped profile. In one example, the T-shaped bridging component has an upright flange abutting the edge of the wing tip device lower cover, an outboard flange abutting the interior surface of the wing tip device lower cover, and an inboard flange extending to contact the interior surface of the lower wing cover.

The seal may include a seal strip. The seal strip may include a profile which cooperates with a mating profile of the bridging member. Alternatively, the seal may consist of a sealant material only. In one example, the seal includes a combination of a seal strip and sealant material. The sealant material is preferably a curable aero sealant.

The gap may be at least 10 mm. The gap is preferably less than 20 mm.

The wing tip device may be attached to the outboard end of the wing by joint, which includes a pinned lug joint. The joint may further include a tension joint between abutting components. In one example, the tension joint may be disposed nearest the upper wing cover and the pinned lug joint may be disposed nearest the lower wing cover.

The wing tip device may include an essentially planar winglet and a curved transition region arranged between the wing and the winglet. The transition region may have a curvature of increasing local dihedral in the outboard direction. Alternatively, the wing tip device may be a winglet, a wing tip fence, or a raked wing tip, for example.

The wing tip device is preferably removable.

Any of the optional features described above may be applied to any of the described aspects of the invention either individually or in any combination.

BRIEF DESCRIPTION OF THE DRAWINGS

Embodiments of the invention will now be described with reference to the accompanying drawings, in which:

FIG. 5 illustrates detail A of FIG. 3 showing a seal assembly for aerodynamically sealing the gap between opposing edges of the wing tip device lower cover and the lower wing cover, in which the seal assembly includes a bridging component and a seal comprising sealant material;

FIG. 6 illustrates a three dimensional view of the bridging component of the seal assembly;

FIG. 7 illustrates an alternative seal assembly including a seal strip received in a profile formed in an alternative bridging component and with sealant material in-fill;

DETAILED DESCRIPTION OF EMBODIMENT(S)

Figure 1:
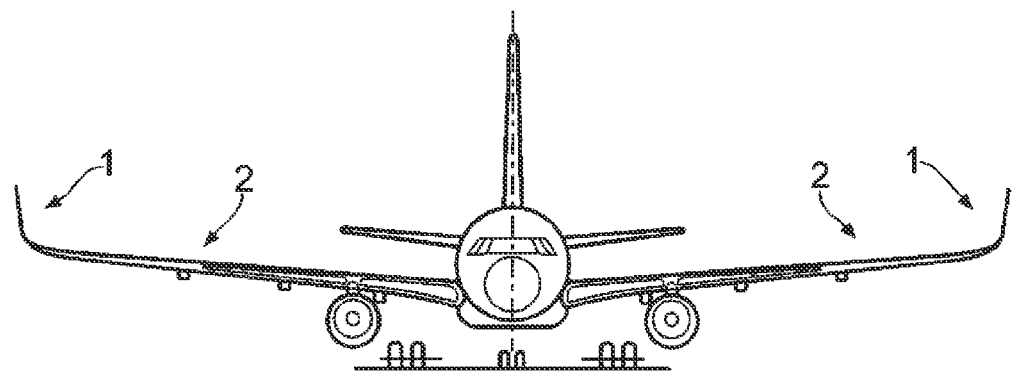
FIG. 1 illustrates a view looking aft of an aircraft having a wing assembly including a wing tip device attached to the outboard end of the aircraft wing.

FIG. 1 illustrates a commercial jet aircraft including a wing assembly having a wing tip device 1 attached to the outboard end of a wing 2.

Figure 2:
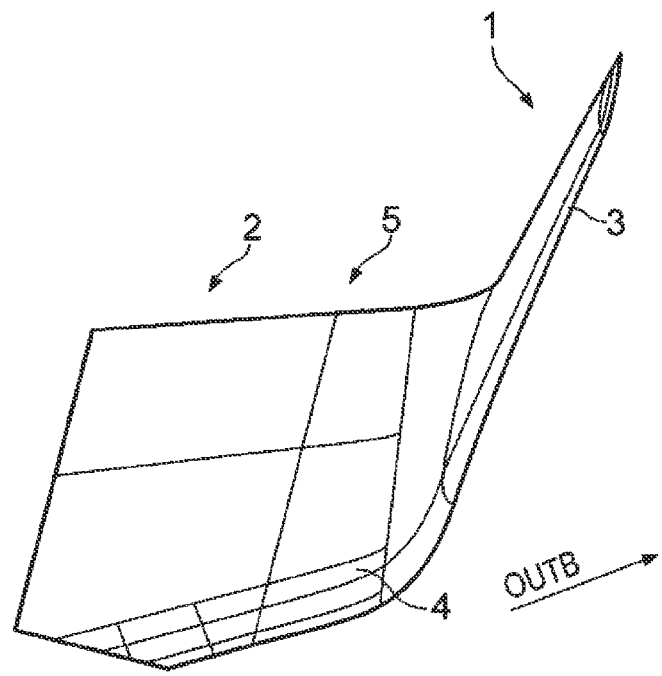
FIG. 2 illustrates the outboard end of the aircraft wing assembly in detail.

FIG. 2 illustrates the outboard end of the wing assembly in detail. The wing tip device 1 is substantially as described in WO2008/061739A, the contents of which are incorporated herein by reference. The wing tip device 1 generally comprises a substantially planar winglet 3 and a transition region 4 arranged between the wing 2 and the winglet 3. The transition region 4 has a curvature of local dihedral that increases from a low angle, or an angle of approximately zero, at or near the outboard end of the wing 2 and increases in the outboard direction. The winglet 3 extends upwardly from the transition region 4 and is inclined with respect to the vertical plane. In one example, the wing tip device 1 is approximately 2.5 meters tall and weighs approximately 120 kgs. The wing tip device 1 is used to reduce the induced drag on the wing leading to improved fuel efficiency and reduced carbon emissions.

The aircraft wing 2 has a conventional wing box structure including a front spar, a rear spar, a plurality of ribs extending in a chordwise direction between the front and rear spars, and upper and lower wing covers which are attached to the front and rear spars and to the ribs.

Figure 3:
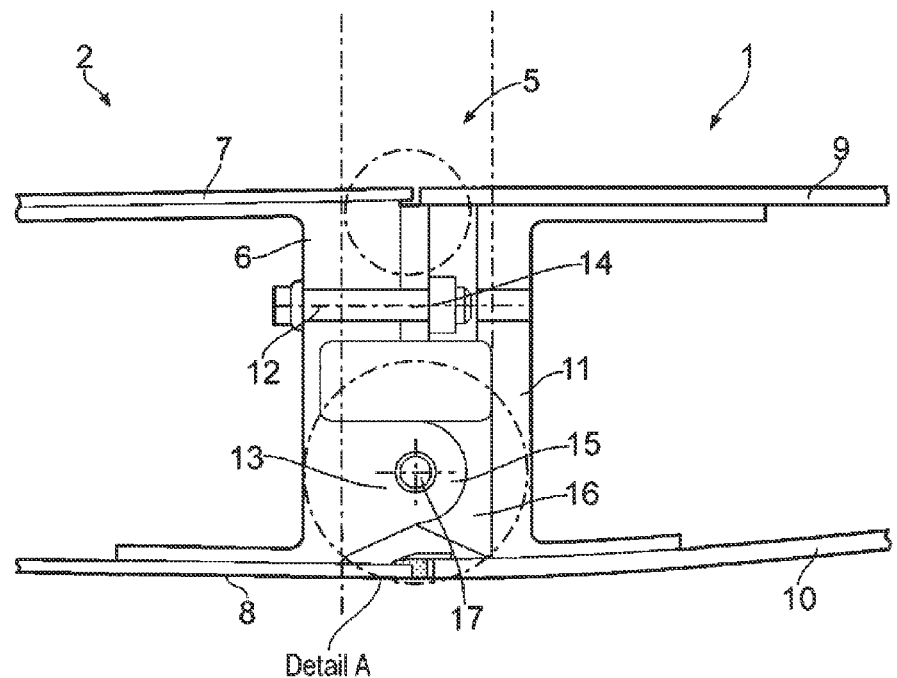
FIG. 3 illustrates a partial section view of a combined tension joint and pinned lug joint for attaching the wing tip device to the outboard end of the wing.

FIG. 3 illustrates a partial section view of a combination joint 5 used to attach the wing tip device 1 to the outboard end of the wing 2. The outboard end of the wing 2 includes an outboard wing rib 6 extending between the upper wing cover 7 and the lower wing cover 8. The outboard wing rib 6 has a generally C-shaped cross section. The transition region 4 of the wing tip device 1 includes an upper tip device cover 9 and a lower tip device cover 10. The wing tip device 1 further includes a plurality of ribs and the inboard rib 11 is shown in FIG. 3. The inboard rib 11 has a generally C-shaped cross section and is arranged back-to-back with the outboard wing rib 6. The ribs 6, 11 each have a substantially vertical web with oppositely facing upper and lower flanges.

Figure 4:
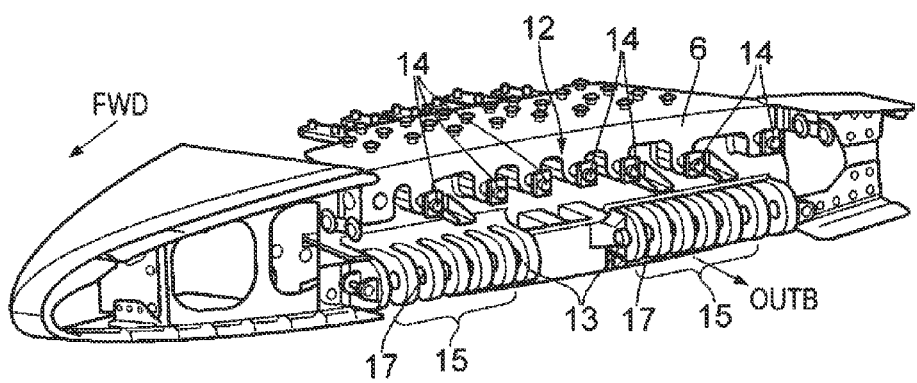
FIG. 4 illustrates a cut away view of the wing box rib at the outboard end of the wing, which forms part of the combination joint illustrated in FIG. 3.

The combination joint 5 includes the outboard wing rib 6, the inboard wing tip device rib 11, an upper tension joint 12 and a lower pinned lug joint 13. The tension joint 12 comprises abutting surfaces of the ribs 6, 11 and a plurality of tension fittings 14. As best shown in FIG. 4, the tension joint 12 includes tension fittings 14 arranged spaced generally chordwise across the joint. Each tension fitting includes a tension bolt and a barrel nut. Each tension bolt is disposed within a through hole formed in the ribs 6, 11.

The pinned lug joint 13 is disposed nearest the lower wing cover 8 offset below the horizontal centre line of the joint 5. The pinned lug joint 13 includes groups of lugs on both the wing side of the joint and on the wing tip device side of the joint. The groups of lugs on each side of the joint 13 are oppositely facing (inboard/outboard). Each lug includes a lug hole and a pin passes through the aligned lug holes of each of the groups of lugs. The pinned lug joint 13 effectively transfers the bending, yaw and shear loads generated by the wing tip device 1 into the wing 2 during flight.

The wingtip device 1 is taller, heavier and generates significantly higher bending and yaw moments than conventional wingtip devices, e.g. a wingtip fence. The combination joint 5 is capable of transferring these higher bending and yaw moments, at the same time as the shear loading, over a relatively small area (less than 0.1 m²) available at the outboard end of the wing tip 2 for attaching the wing tip device 1.

The use of a pinned lug joint 13 within the combination joint 5 is unusual for joining back-to-back ribs within an aerofoil structure but has been found to be highly efficient for transferring the higher bending and yaw moments generated by the wingtip device 1. However, the use of a pinned lug joint introduces difficulties during installation and removal of the wing tip device 1 from the outboard end of the wing 2. There is a risk that in moving the relatively larger and heavier wing tip device 1 into position with respect to the outboard end of the wing 2 there is the possibility of overshoot as the sets of lugs 15, 16, prior to pinning may, overshoot beyond the position where their respective lug holes come into alignment for insertion of the pins 17. This overshoot could be problematic as the lower wing cover 8 and the wing tip device lower cover 10 could clash causing damage to one or other of these components. Moreover, it may in fact be desirable to rotate the wing tip device 1 with respect to the wing 2 by a small angle (less than 5°) during installation of the wing tip device 1 for ease of constructing the pinned lug joints 13.

Accordingly, a larger than normal gap, g, is provided between opposing edges 18, 19 of the lower wing cover 8 and the wing tip device lower cover 10. This gap, g, is at least 5 mm wide and is preferably at least 10 mm wide but is generally less than 20 mm wide. This contrasts with a gap of approximately 2 mm which is found between the upper wing cover 7 and the wing tip device upper cover 9. For aerodynamic performance reasons, the gap, g, is required to be sealed after joining the wing tip device 1 to the wing 2.

As best shown in FIG. 5, a seal assembly 20 is provided for aerodynamically sealing the gap, g, between the lower wing cover 8 and the wing tip device lower cover 10. The seal assembly 20 includes a bridging component 21 on an interior side of the gap, g, and a seal 22 which fills the gap, g, and is supported by the bridging component 21. The bridging component 21 has a generally T-shaped profile and includes an upright flange 23 adjacent the edge 19 of the wing tip device lower cover 10, an outboard flange 24 abutting the interior surface of the wing tip device lower cover 10, and an inboard flange 25 which extends to contact the interior surface of the lower wing cover 8. A three dimensional view of the generally T-shaped bridging component 21 is shown in FIG. 6. The bridging component 21 includes several cut outs along its length to accommodate various parts of the combination joint 5, depending on specific design requirements The inboard flange 25 of the bridging component 21 includes a taper in the outboard direction so as to provide a relatively flexible contact edge with the interior surface of the lower wing cover 8. This accommodates tolerance in the thickness of the lower wing cover 8 and the wing tip device lower cover 10. The bridging component 10 is however substantially rigid to ensure the integrity of the seal assembly 20. The bridging component 21 may be made of rubber material, or any other suitable material.

The seal 22 may be a curable aero sealant of conventional type. The cured sealant of the seal 22 is supported by the bridging component 21. The bridging component 21 is fixed to the wing tip device lower cover 10 prior to installation of the wingtip device 1 at the outboard end of the wing 2. Once the wingtip device 1 has been installed and joined to the outboard end of the wing 2 the seal 22 is formed so as to infill the cavity bounded by the bridging component 21 and the edge 18 of the lower wing cover 8 so as to complete the seal assembly 20. The volume of sealant material required to form the seal 22 may be such that successive beads of sealant material may need to be applied and cured prior to application of the subsequent layer of sealant material. The seal 22 may be formed so as to completely seal the gap, g, and provide a substantially flush outer aerodynamic surface between the outer surfaces of the lower wing cover 8 and the wingtip device lower cover 10.

FIG. 7 illustrates an alternative seal assembly 20' in which the bridging component 21' includes a profile 26 which receives a seal strip 27. The seal strip 27 has a mating profile for cooperating with the profile 26. Aero sealant 28 is then applied to infill the remaining gaps around the seal strip 27 to complete the seal 22'. The seal assembly shown in FIG. 7 is particularly advantageous where the gap, g, between the lower wing cover 8 and the wingtip device lower cover is large. The bridging component 21' may be fixed to the wing tip device lower cover 10 prior to installation of the wing tip device 1 on the outboard end of the wing 2 in the same manner as described above with reference to FIG. 5. The seal strip 27, which may be made of a rubber material or any other suitable material, can then be run along the profile 26 prior to infilling with the aero sealant 28. The reduced volume of aero sealant 28 in the embodiment shown in FIG. 7 may avoid any shrinkage issues which may be apparent with larger volumes of aero sealant and may reduce the time to cure.

FIGS. 8-12 illustrate another alternative seal assembly 20". The seal assembly 20" includes a central seal portion 29 sandwiched between a bridging portion 21" and a retaining portion 30. The seal portion 29 has a generally rectangular cross-section and is sized so that it substantially fills the gap, g. It is formed in this embodiment from rubber reinforced with fabric, so that it is inherently flexible yet damage resistant and resilient.

The bridging portion 21" comprises an outboard flange 21a" which extends outboard from, and is formed integrally with, the seal portion 29. The outboard flange 21a" has a generally triangular shaped cross-section, with a sloped face which abuts a sloping chamfered interior face of the wing tip lower cover 10 (see FIG. 8). The outboard flange 21a" is formed from the same reinforced rubber material as the seal portion 29.

Figure 8:
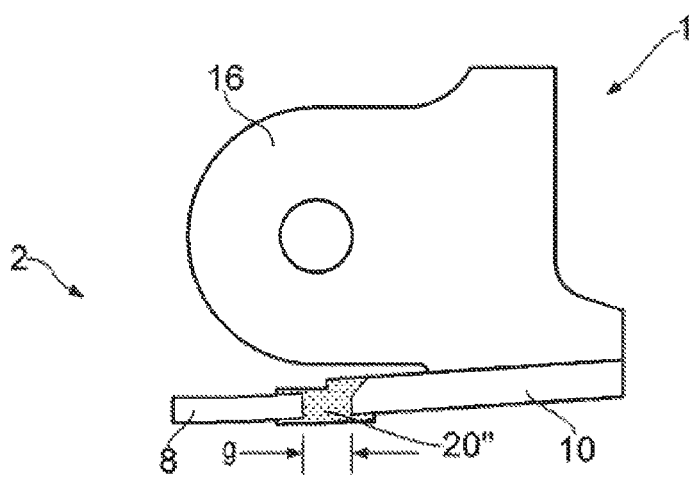
FIG. 8 shows a schematic view of an alternative seal assembly according to another embodiment of the invention.
Figure 9:
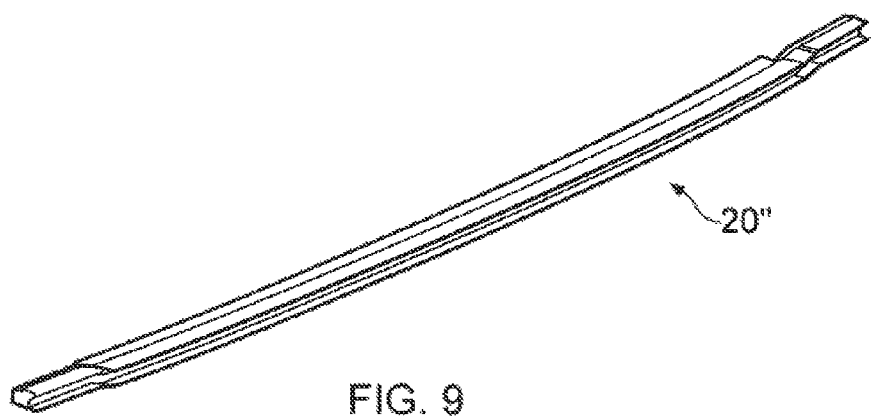
FIG. 9 shows an isometric view of the seal assembly of FIG. 8.
Figure 10:
FIG. 10 shows a top view of the seal assembly of FIGS. 8 and 9.
Figure 11:
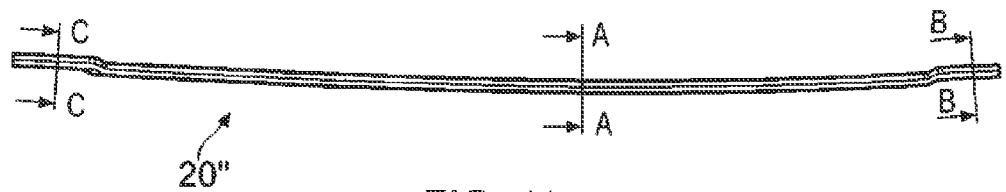
FIG. 11 shows a side view of the seal assembly of FIGS. 8 and 9.
Figure 12A:
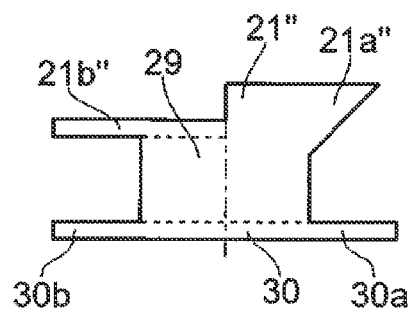
FIGS. 12A and 12C show cross-sectional views taken at line A-A shown in FIG. 11.
Figure 12B:
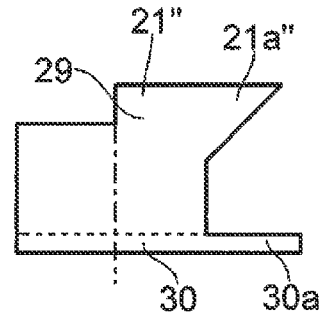
FIG. 12B shows a cross-sectional view taken at lines B-B and C-C shown in FIG. 11.
Figure 12C:
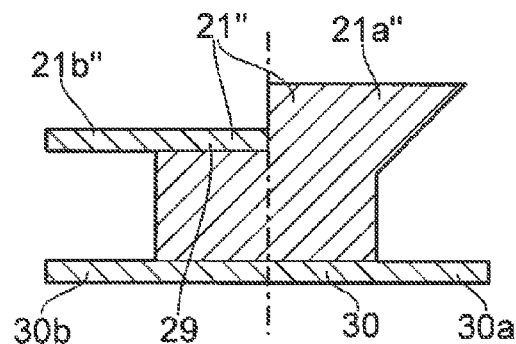

Along a majority of the length of the seal assembly 20", but not at regions at the ends thereof (see FIGS. 11 and 12A-C), the bridging portion 21" also comprises an inboard flange 21b" which extends inboard from the seal portion 29. The inboard flange 21b" comprises a thin strip of glass fibre-reinforced composite material which is bonded to the seal member 29 so as to leave an overhanging region which forms the flange. As best seen in FIG. 8, the inboard flange 21b" abuts an interior face of the lower wing cover 8. The strip of composite material which forms the inboard flange 21b" serves both to increase the overall rigidity of the seal assembly 20", and to enhance the ability of the bridging portion 21" to retain the seal portion 29 within the gap, g.

The retaining portion 30 comprises a thin strip of glass fibre-reinforced composite material which is fixed to the seal portion so as to overhang in both the inboard and outboard directions. The inboard overhang forms an inboard flange 30b which abuts an exterior surface of the lower wing cover 8, while the outboard overhang forms an outboard flange 30a which abuts an exterior surface of the wing tip device lower cover 10 (see FIG. 8). Like the inboard flange 21b" of the bridging portion 21", the composite retaining portion 30 serves to increase the overall rigidity of the seal assembly 20", and thus to help retain the seal portion 29 within the gap, g.

The bridging portion 21" and the retaining portion 30 thus act to retain the seal portion 29 in a position in which it fills the gap, g, as shown in FIG. 8.

During installation the elongate seal assembly 20" is slid along the gap so that the seal portion 29 slides within the gap, the bridging portion 21" slides along an interior side of the gap, and the retaining portion 30 slides along an exterior side of the gap. Thus, one single process step of sliding the seal assembly 20" into its final position ensures that the seal portion 29, bridging portion 21" and retaining portion 30 are also in their final positions.

A particular advantage of the embodiment of FIGS. 8-12 is that the seal assembly 20" is self-retaining, with there being no requirement to fix the bridging portion 21" or retaining portion 30 to the lower wing cover 8 or wing tip device lower cover 10 in order to retain the seal assembly 20" in place.

The embodiments of the seal assembly described above are particularly advantageous over other means for sealing the gap, g, between the lower wing cover and the wing tip device lower cover. In particular, the seal assemblies described above provide benefits of low material and installation costs and ease of repair whilst providing a flush outer aerodynamic surface, ease of installation of the wing tip device 1 and protection for the wing tip device 1 during installation. Comparative seal assembly options are briefly described below.

In a first comparative example, a seal assembly may include a profiled seal strip. The profiled seal strip is easy to manufacture and install but the profile may provide an undesirable aerodynamic step in the lower wing surface.

In a second comparative example, a seal assembly may include a P-seal fixed with a retainer to the interior surface of the wing tip device lower cover. A disadvantage of the P-seal is that it can only be replaced by removing the wing tip device from the wing. Installation of the P-seal and potential adjustment of its position may be enhanced by providing a ramp on the interior surface of the wing tip device lower cover towards the gap. However, the ramped surface would increase the complexity of the wing tip device lower cover.

In a third comparative example, the outer surface of the wing tip device lower cover may include a ramp towards the gap to accommodate a generally wedge shaped thin sealing plate, which may be fastened to the wing tip device lower cover. The increased manufacturing complexity of forming the ramp in the outer surface of the wing tip device lower cover may be disadvantageous.

A fourth comparative example provides for machining the outer surface of the wing tip device lower cover so as to provide a rebate for receiving a P-seal and retainer, which may be affixed to the wing tip device lower cover. The post manufacture machining operation for producing the rebate in the outer surface of the wingtip device lower cover may be disadvantageous.

In a fifth comparative example, the wing tip device lower cover may include a joggle adjacent the gap. A P-seal and retainer may be affixed to the outer surface of the joggle. However, the joggle at the inboard edge of the wing tip device lower cover may provide manufacturing difficulties if it conflicts with joggles formed at the leading and trailing edges of the winged device lower cover that may be provided for attachment of leading and trailing edge structures.

Although the invention has been described above with reference to one or more preferred embodiments, it will be appreciated that various changes or modifications may be made without departing from the scope of the invention as defined in the appended claims.

The invention claimed is:

1. An aircraft wing assembly, comprising:
a wing having a wing box structure including an upper wing cover and a lower wing cover;
a wing tip device attached to the outboard end of the wing, wherein the wing tip device includes an upper cover and a lower cover;
a gap of at least 5 mm between opposing edges of the lower cover of the wing tip device and the lower wing cover;
a seal assembly configured to aerodynamically seal the gap, wherein the seal assembly includes a bridging component on an interior side of the gap and a seal, wherein the seal fills the gap and is supported by the bridging component;
wherein the bridging component has a generally T-shaped profile and includes an upright flange abutting the edge of the wing tip device lower cover, an outboard flange abutting the interior surface of the wing tip device lower cover, and an inboard flange extending to contact the interior surface of the lower wing cover.

2. An aircraft wing assembly, comprising:
a wing having a wing box structure including an upper wing cover and a lower wing cover;
a wing tip device attached to the outboard end of the wing, wherein the wing tip device includes an upper cover and a lower cover;
a gap of at least 5 mm between opposing edges of the lower cover of the wing tip device and the lower wing cover;
a seal assembly configured to aerodynamically sealing the gap, wherein the seal assembly includes a bridging component on an interior side of the gap and a seal which fills the gap and is supported by the bridging component,
wherein the bridging component has an upright flange abutting the edge of the wing tip device lower cover, an outboard flange abutting an interior surface of the wing tip device lower cover, and an inboard flange extending to contact an interior surface of the lower wing cover, and wherein the upright flange, the outboard flange and the inboard flange are formed as a single component.

3. The aircraft wing assembly according to claim 2, wherein the wing tip device lower cover, the lower wing cover and the seal provide a substantially flush aerodynamic surface.

4. The aircraft wing assembly according to claim 2, wherein the bridging component is attached to the wing tip device.

5. The aircraft wing assembly according to claim 2, wherein the bridging component is substantially rigid.

6. The aircraft wing assembly according to claim 5, wherein the bridging component includes rubber material.

7. The aircraft wing assembly according to claim 2, wherein the bridging component has a generally T-shaped profile.

8. The aircraft wing assembly according to claim 2, wherein the seal includes a seal strip.

9. The aircraft wing assembly according to claim 8, wherein the seal strip includes a profile which cooperates with a mating profile of the bridging member.

10. The aircraft wing assembly according to claim 2 wherein the seal consists of a curable sealant material only.

11. The aircraft wing assembly according to claim 2, wherein the wing tip device is attached to the outboard end of the wing by a joint, which includes a pinned lug joint.

12. The aircraft wing assembly according to claim 11, wherein the joint further includes a tension joint between abutting components.

13. The aircraft wing assembly according to claim 12, wherein, within the joint, the tension joint is disposed nearest the upper wing cover and the pinned lug joint is disposed nearest the lower wing cover.

14. The aircraft wing assembly according to claim 2, wherein the wing tip device includes an essentially planar winglet and a curved transition region arranged between the wing and the winglet.

15. The aircraft wing assembly according to claim 2, wherein the transition region has a curvature of increasing local dihedral in the outboard direction.

16. The aircraft wing assembly according to claim 2, wherein the wing tip device is removable.

17. The aircraft including the wing assembly of claim 2.

18. A method of attaching a wing tip device to the outboard end of an aircraft wing, the wing having a wing box structure including an upper wing cover and a lower wing cover, and the wing tip device having an upper cover and a lower cover, the method comprising:
   bringing the wing tip device and the wing together;
   joining the wing tip device to the outboard end of the wing, wherein a gap between opposing edges of the wing tip device lower cover and the lower wing cover is at least 5 mm at completion of the joint; and
   installing a seal assembly to aerodynamically seal the gap, wherein the seal assembly includes a bridging portion arranged to extend across an interior side of the gap to bridge the gap and a seal portion projecting from the bridging portion to fill the gap,
   wherein the bridging portion comprises an inboard flange which abuts an interior surface of the lower wing cover, and an outboard flange which abuts an interior surface of the wing tip lower cover, and wherein the seal portion abuts the edge of the wing tip device lower cover, and the bridging portion and the seal portion are formed as a single component.

19. The method according to claim 18, wherein the step of installing the seal assembly includes sliding the seal assembly along the gap with the bridging component at the interior side of the gap and the seal portion within the gap.

20. The method according to claim 18, wherein the seal assembly includes a reinforcing component fixed to the seal portion and arranged to extend across an exterior side of the gap to retain the seal portion within the gap, and the step of installing the seal assembly includes sliding the seal assembly along the gap with the bridging component at the interior side of the gap, the seal portion within the gap and the reinforcing component at the exterior side of the gap.

21. The method according to claim 18, wherein the step of joining the wing tip device to the outboard end of the wing includes forming a pinned lug joint.

22. A method of attaching a wing tip device to the outboard end of an aircraft wing, the wing having a wing box structure including an upper wing cover and a lower wing cover, and the wing tip device having an upper cover and a lower cover, the method comprising:
   bringing the wing tip device and the wing together;
   joining the wing tip device to the outboard end of the wing, wherein a gap between opposing edges of the wing tip device lower cover and the lower wing cover is at least 5 mm at completion of the joint; and
   installing a seal assembly for aerodynamically sealing the gap, wherein the seal assembly includes a bridging component on an interior side of the gap, and a seal which fills the gap and is supported by the bridging component,
   wherein the bridging component has an upright flange abutting the edge of the wing tip device lower cover, an outboard flange abutting an interior surface of the wing tip device lower cover, and an inboard flange extending to contact an interior surface of the lower wing cover, and wherein the upright flange, the outboard flange and the inboard flange are formed as a single component.

* * * * *